(12) United States Patent
Pai

(10) Patent No.: US 6,494,419 B2
(45) Date of Patent: Dec. 17, 2002

(54) FOLDABLE STAND

(76) Inventor: Lucas Pai, 8 Fl.-2, No. 160, Sec. 1, Chung-Kang Rd., Taichung (TW)

( * ) Notice: Subject to any disclaimer, the term of this patent is extended or adjusted under 35 U.S.C. 154(b) by 0 days.

(21) Appl. No.: 09/852,749

(22) Filed: May 11, 2001

(65) Prior Publication Data

US 2002/0166929 A1 Nov. 14, 2002

(51) Int. Cl.[7] .............................................. A45D 19/04
(52) U.S. Cl. .................... 248/127; 248/188.6; 248/150; 248/148; 248/168; 248/169; 108/132; 108/157.15; 108/157.17; 126/276
(58) Field of Search ............................ 108/132, 157.15, 108/157.17; 248/188.6, 150, 166, 434, 170, 439, 669, 679, 167, 436, 129, 148, 168, 169, 127; 126/276, 305

(56) References Cited

U.S. PATENT DOCUMENTS 2,348,043 A * 5/1944 Webb et al. .................. 248/13
5,957,062 A * 9/1999 Cox et al. .................... 108/133
6,257,229 B1 * 7/2001 Stewart et al. .............. 126/276
6,305,117 B1 * 10/2001 Hales, Sr. ...................... 42/94

* cited by examiner

Primary Examiner—Kimberly Wood
(74) Attorney, Agent, or Firm—Alan D. Kamrath; Rider, Bennett, Egan & Arundel

(57) ABSTRACT

A stand to support an object has a bottom frame and two side frames. The side frames are each pivotally attached to opposite ends of the bottom frame with a pair of pivot pins. The pairs of pivot pins are located at different heights. A clasp is mounted on each side frame to detachably engage the bottom frame. When the clasps are released from the bottom frame, the side frames can be pivoted relative to the bottom frame. The stand is foldable. Because the side frames are respectively pivotally attached to the bottom frame by pairs of pivot pins at different heights, one of the side frames can overlap the other side frame. The size of the stand is reduced. Transporting and storing the stand become more convenient.

20 Claims, 9 Drawing Sheets

FOLDABLE STAND

BACKGROUND OF THE INVENTION

1. Field of the Invention

The present invention relates to a stand, and more particularly to a foldable stand to support a barbecue grill, a water basin or the like.

2. Description of Related Art

A stand supports an object like a barbecue grill, a water basin or the like to elevate the object to a position where the user can easily use the object. A conventional stand to support an object is a fixed structure and is composed of multiple members attached to each other by permanent or semi-permanent fasteners like bolts or rivets. Consequently, the conventional stand is not foldable. A large space is required to transport or to store the conventional stand.

To overcome the shortcomings, the present invention provides a foldable stand to mitigate or obviate the aforementioned problems.

SUMMARY OF THE INVENTION

The main objective of the invention is to provide a stand to support an object and which is foldable. The stand has a bottom frame and two side frames. The side frames are each pivotally attached to opposite ends of the bottom frame with pivot pins. The pivot pins are located at different heights. A clasp is mounted on each side frame to detachably engage with the bottom frame. Consequently, the stand is foldable, and the transportation and storage of the stand are convenient.

Other objects, advantages and novel features of the invention will become more apparent from the following detailed description when taken in conjucntion with the accompanying drawings.

DETAILED DESCRIPTION OF PREFERRED EMBODIMENT

Figure 1:
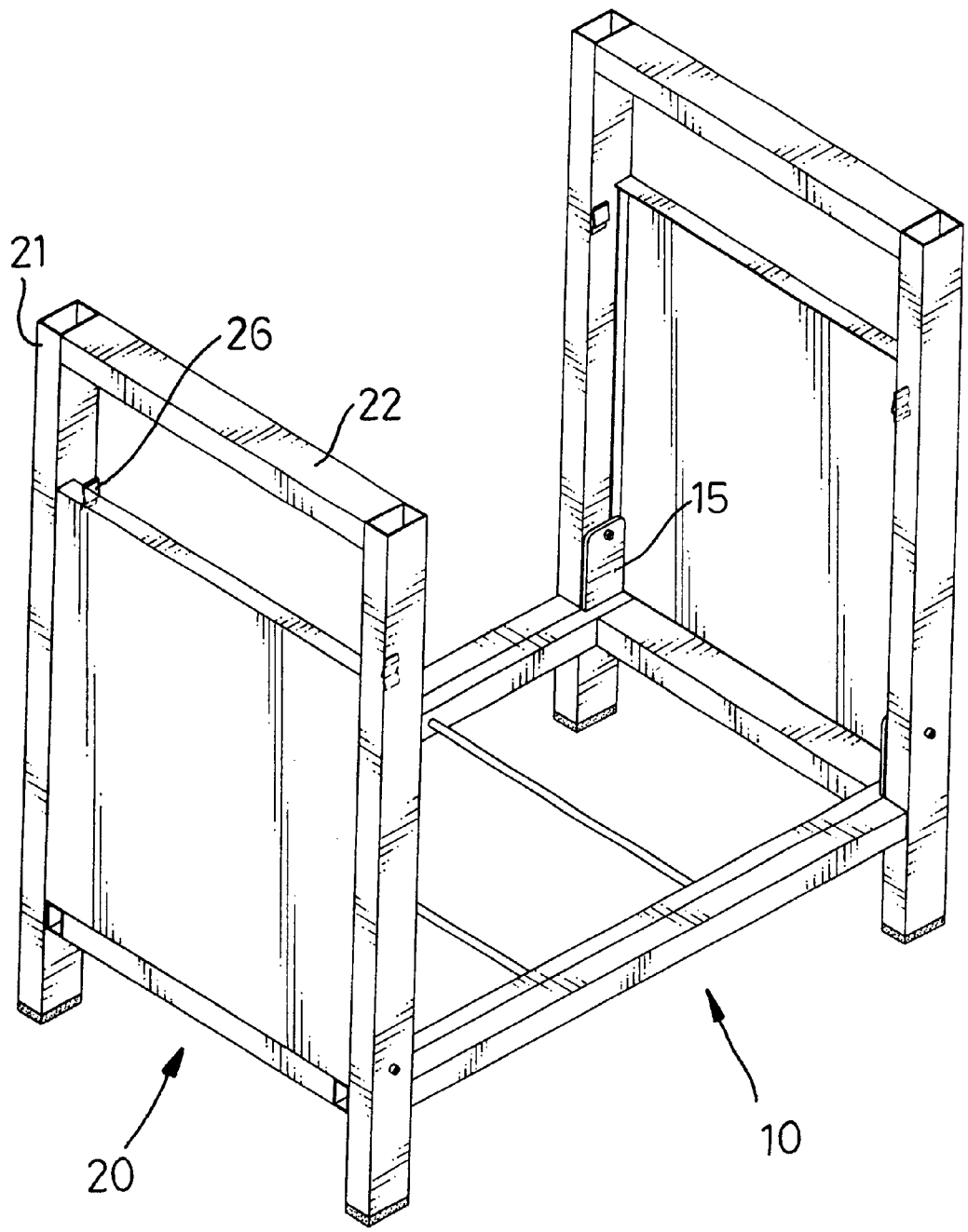
FIG. 1 is a perspective view of a foldable stand in accordance with the present invention.
Figure 2:
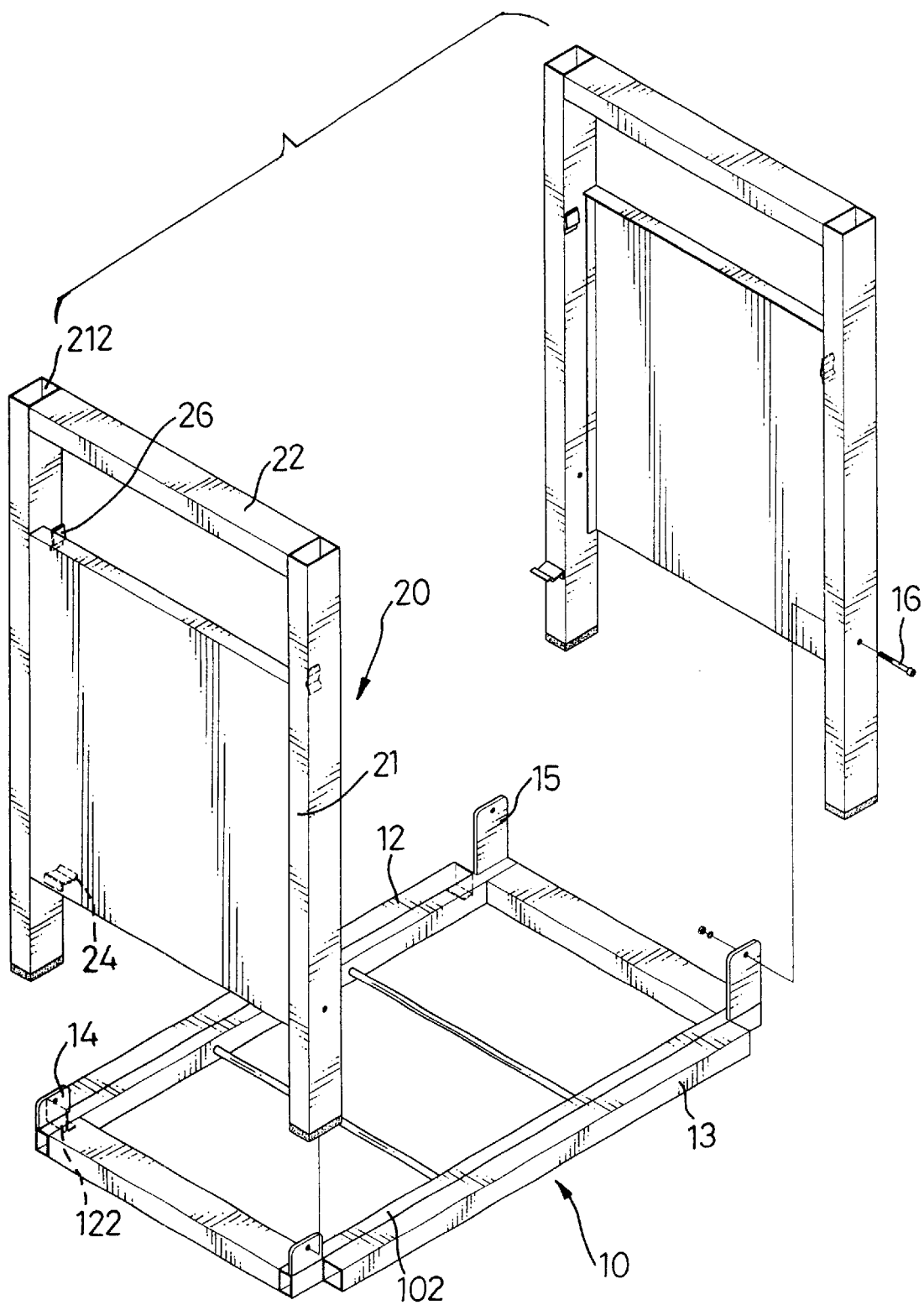
FIG. 2 is a partially exploded perspective view of the stand in FIG. 1.

With reference to FIGS. 1 and 2, a stand in accordance with the present invention comprises a bottom frame (10) and two side frames (20). Each frame (10, 20) is comprised of multiple tubular members. The bottom frame (IO) is comprised of four tubular members assembled in a rectangle. The side frames (20) have similar structures. Each side frame (20) is comprised of two longitudinal tubular members (21) with a top and a bottom end and a lateral tubular member (22) secured between the top ends of the longitudinal tubular member (21) to form an inverse U-shaped frame. The side frames (20) are respectively pivotally attached to opposite ends of the bottom frame (10). A first pivotal plate (14) extends upward from each side of one end of the bottom frame (10), and a second pivotal plate (15) extends upward,from each side of the other end of the bottom frame (10). Each second pivotal plate (15) is longer than each first pivotal plate (14). One of the side frames (20) is pivotally connected to the first pivotal plates (14) with a first pair of pivot pins (16), the other side frame (20) is pivotally connected to the second pivotal plate (15) with a second pair of pivoting pins (16). The second pair of pivotal pins (16) is mounted higher on the longitudinal tubular members (21) than the first pair of pivot pins (16). The difference in the height of the first pair of pivotal pins (16) and the second pair of pivotal pins (16) is substantially equal to the thickness of the side frame (20).

Figure 3:
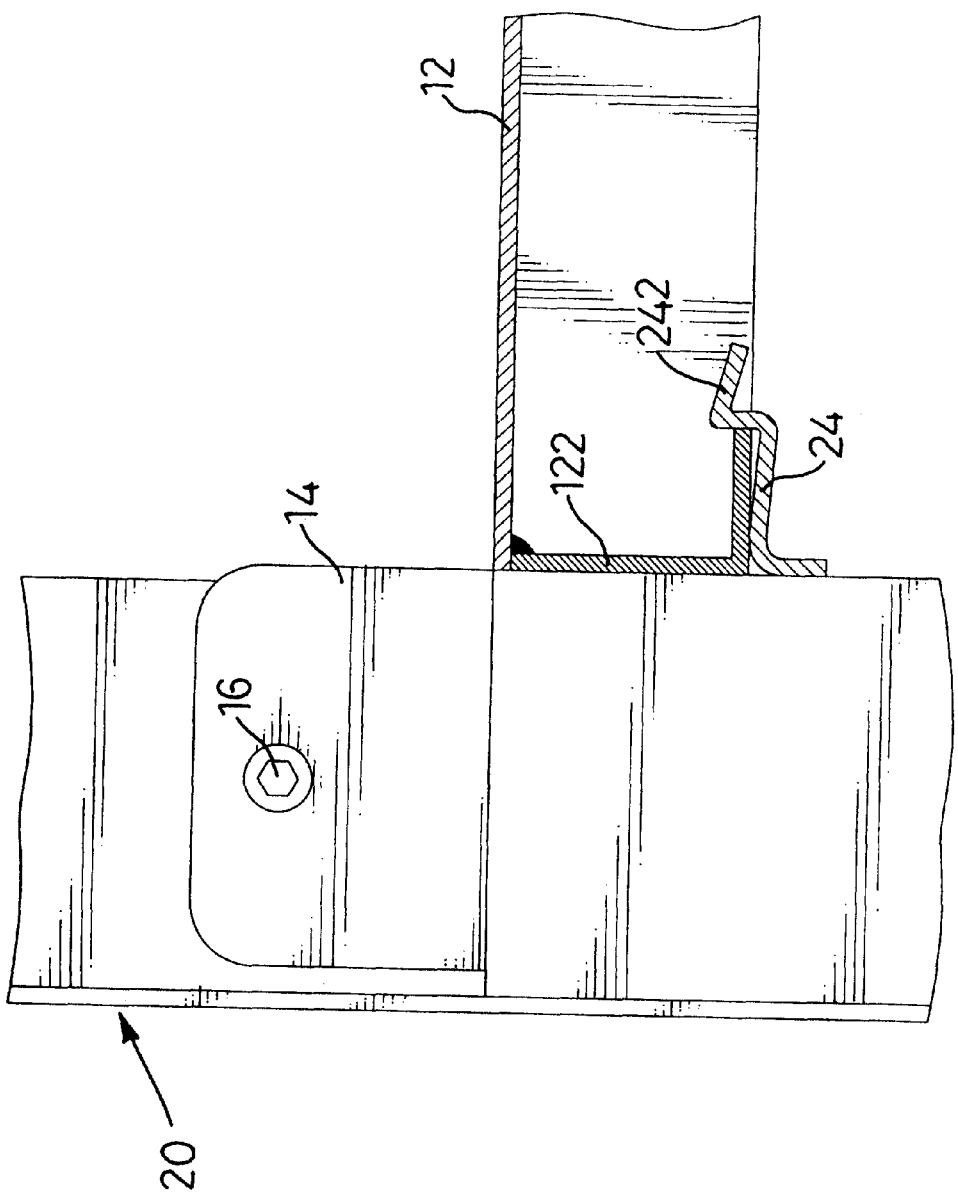
FIG. 3 is an enlarged rear plan view in partial section of the clasp mounted on the side frame engaging with the bottom frame of the stand in FIG. 1.

With reference to FIGS. 2 and 3, a stop (12, 13) is mounted on each side (102) of the bottom frame (10) and has two ends respectively abutting the side frames (20). A clasp (24) is mounted on one of the longitudinal tubular members (21) of each side frame (20) and corresponds to one of the stops (12). In practice, each clasp (24) is formed from a metal strip, and a hook (242) is formed from a metal strip, and a hook (242) is formed on the free end of the clasp (24). The stop (12) corresponding to the clasps (24) has an inverse U-shaped section. An L-shaped lock plate (122) is attached to each end of the stop (12).

Figure 7:
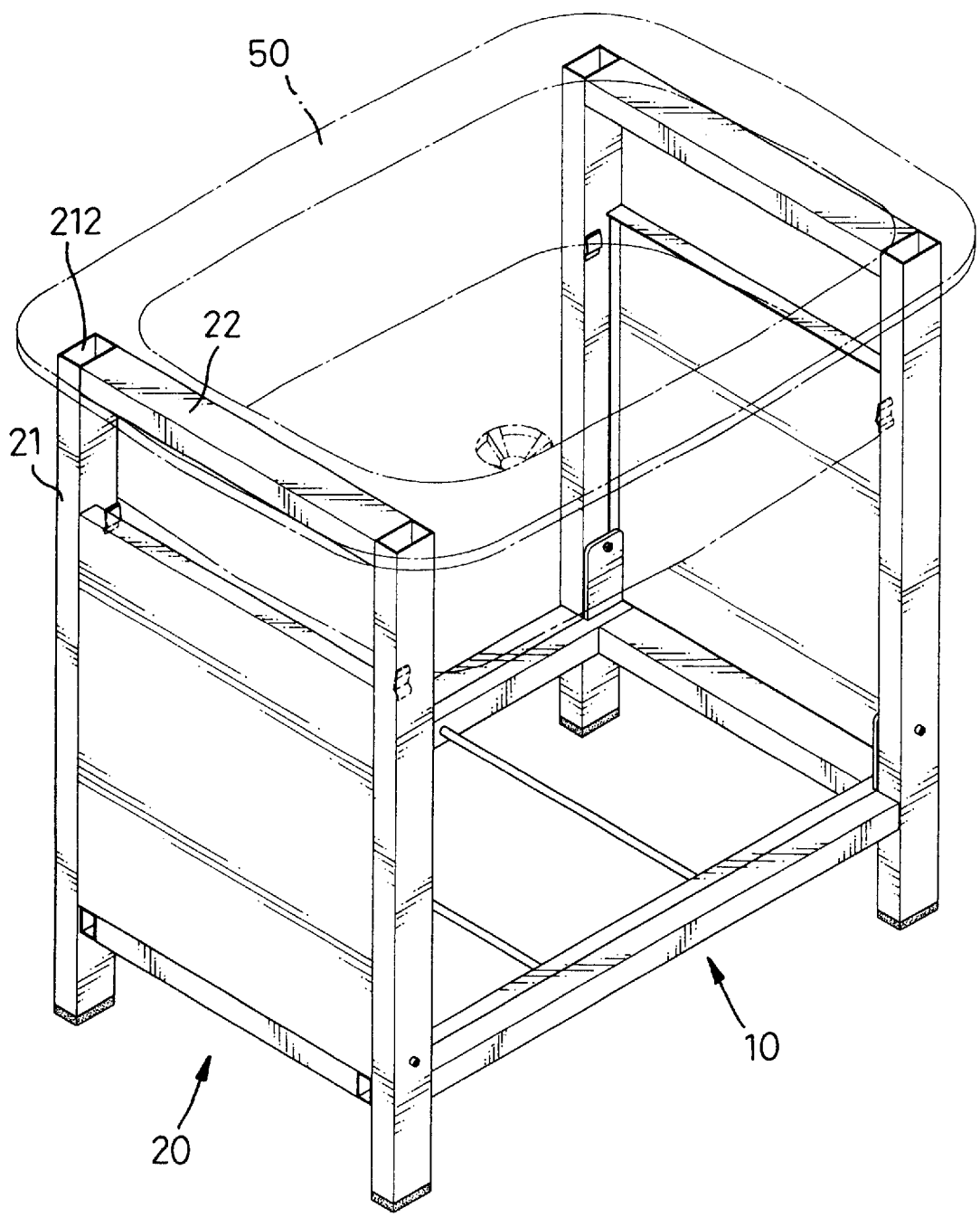
FIG. 7 is a perspective view of the stand in FIG. 1 and a water basin.
Figure 8:
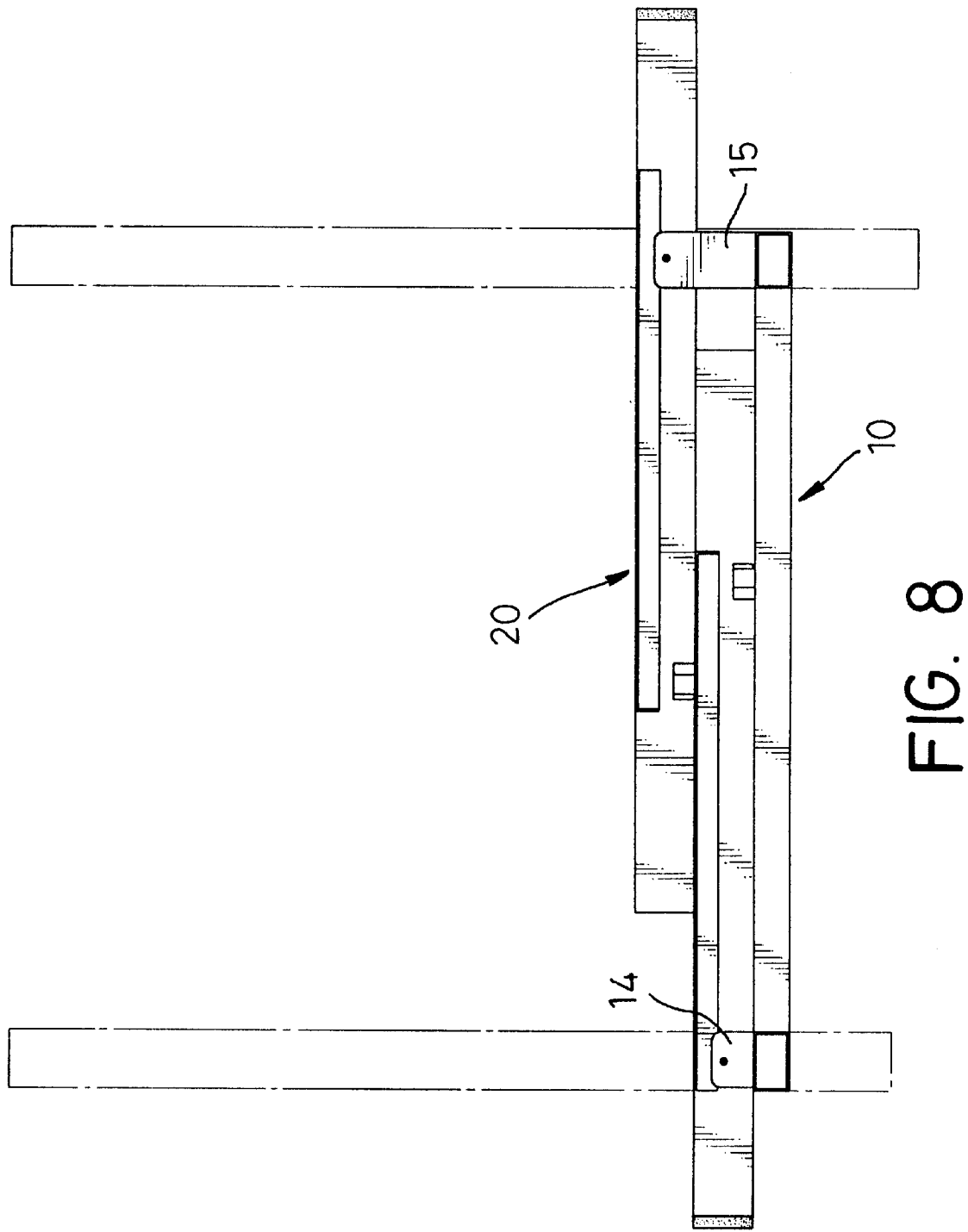
FIG. 8 is an operational front plan view of the stand in FIG. 1 showing the stand erect and folded.
Figure 9:
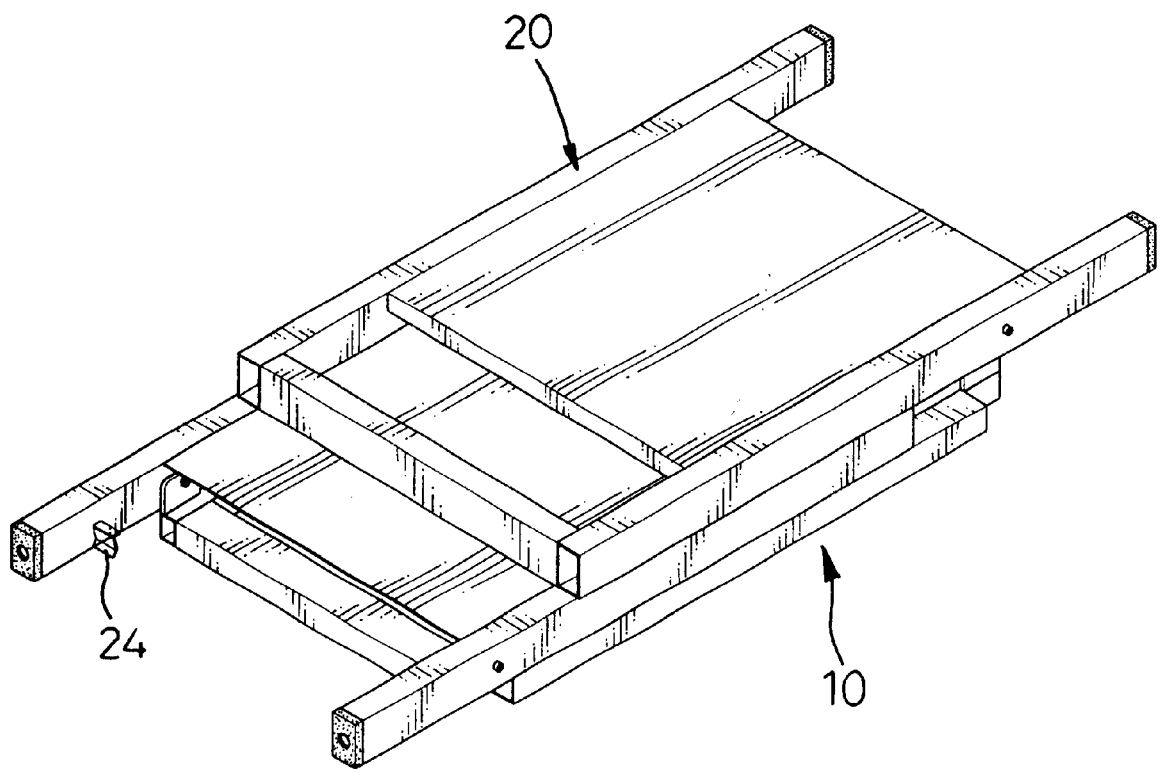
FIG. 9 is a perspective view of the stand in FIG. 1 in a folded state.

When each side frame (20) is pivoted to a position where the side frame (20) is perpendicular to the bottom frame (10), one end of each stop (12, 13) will abut one of the side frames (20). The hook (242) of each clasp (24) on the side frame (20) will engage with the corresponding L-shaped lock plate (122) on the stop (12). The side frames (20) will be perpendicular to the bottom frame (10), and the stand is erect. Accordingly, with reference to FIGS. 4 and 7, a barbecue grill (30) or a water basin (50) can be put on the stand and supported by the side frames (20). In practice, an opening (212) is defined in the top of each longitudinal tubular member (21) of each side frame (20), and stubs (32) are attached to the bottom of the barbecue grill (30) or the water basin (50) to insert into the corresponding openings (212). Consequently, the barbecue grill (30) or the water basin (50) can be securely positioned on the stand due to the engagement between each stub (32) and the corresponding opening (212) in the side frame (20).

Figure 4:
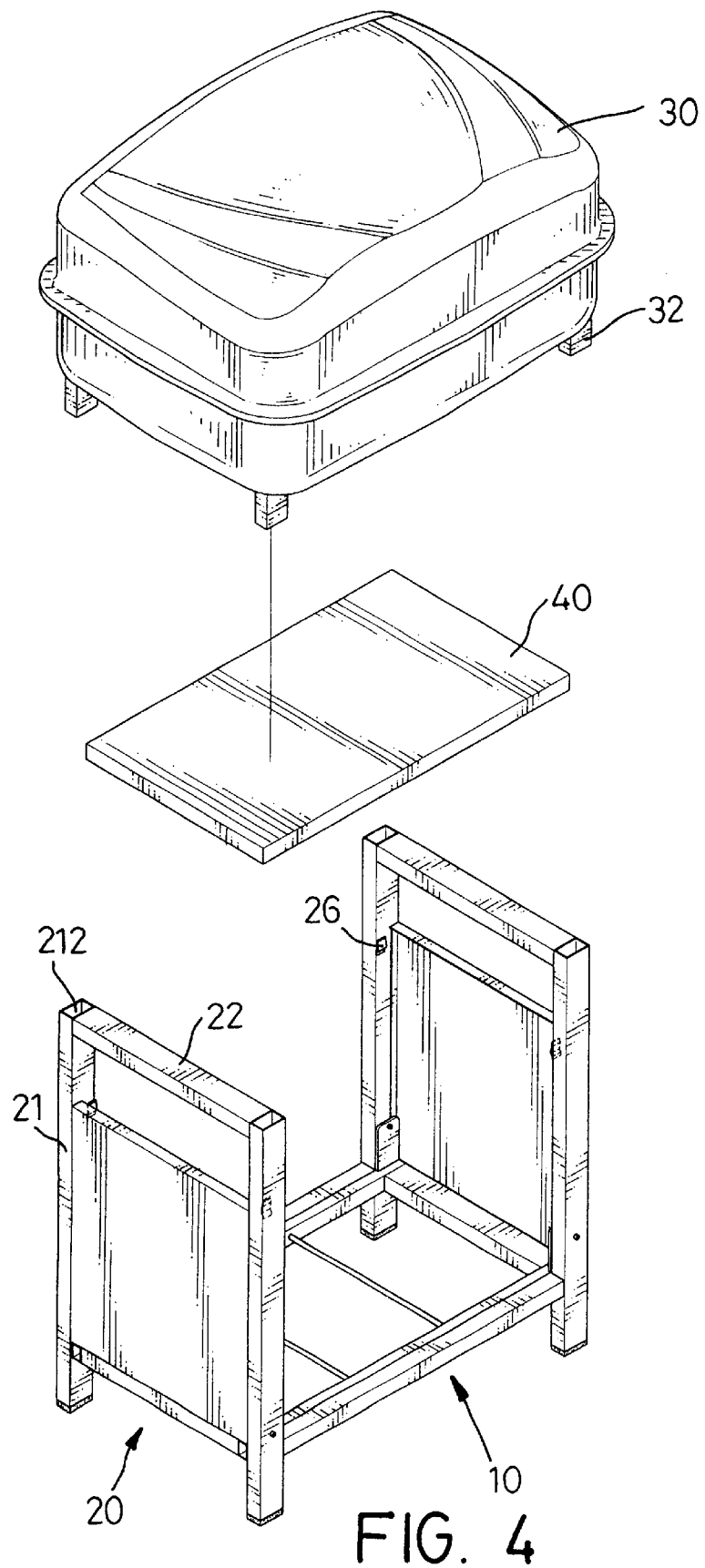
FIG. 4 is an exploded perspective view of the stand in FIG. 1, a shelf and a barbecue grill.
Figure 5:
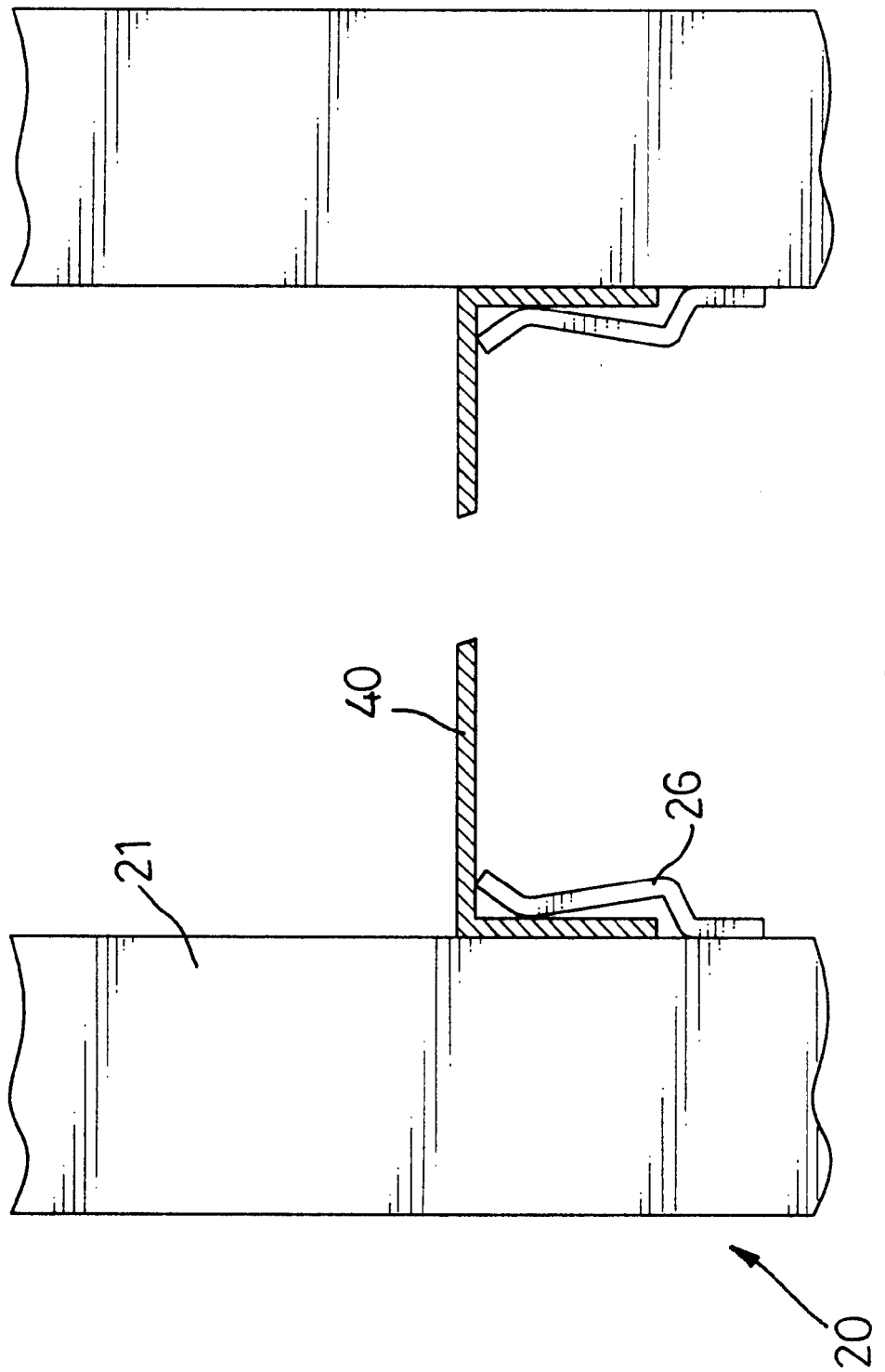
FIG. 5 is an enlarged front plan view in partial section of the junction of the stand and the shelf in FIG. 4.
Figure 6:
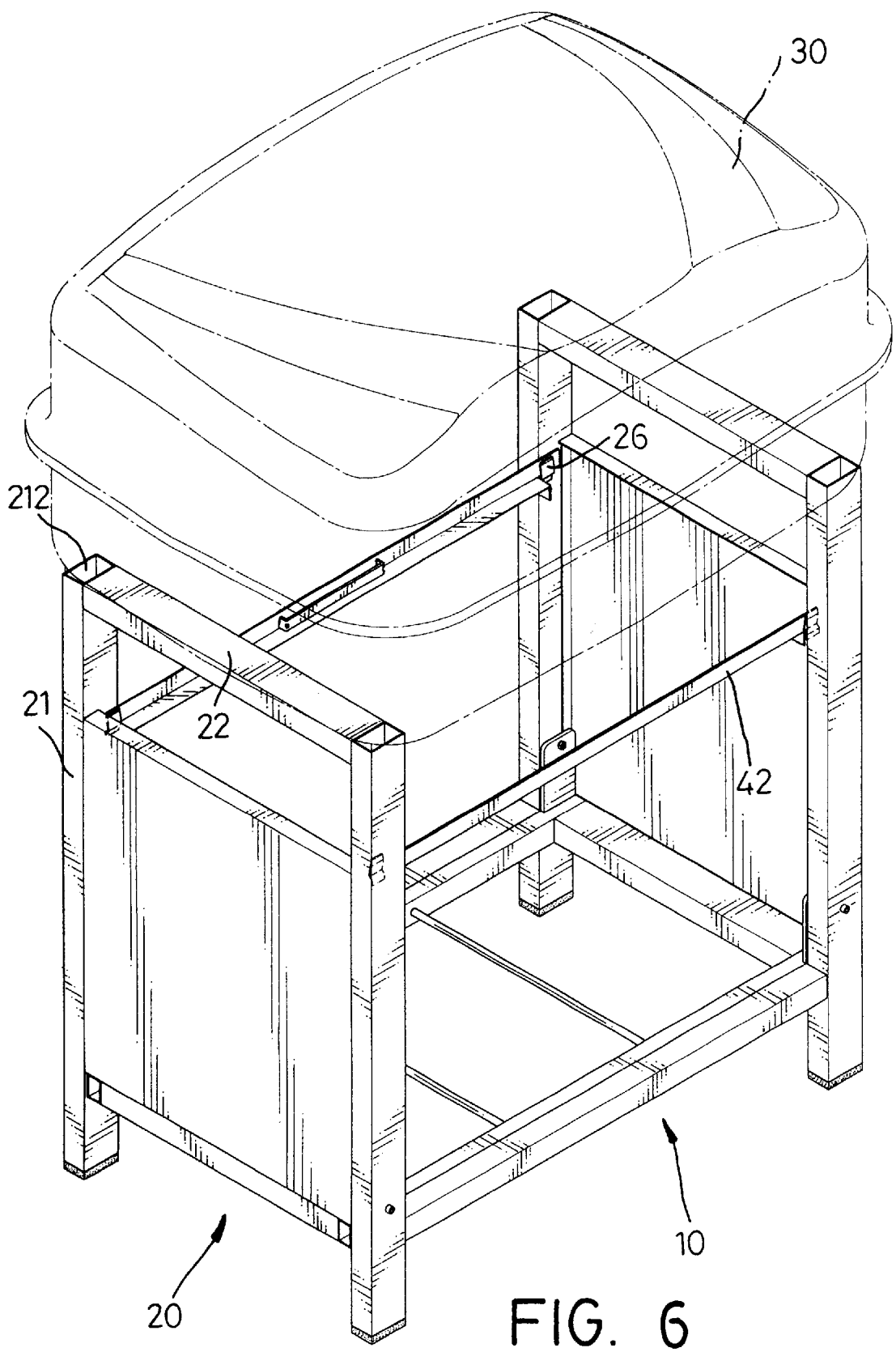
FIG. 6 is a perspective view of the stand in FIG. 1, a bar and the barbecue grill.

With reference to FIGS. 2, 4 and 5, an elastic clip (26) is attached to each longitudinal tubular member (21) of each side frame (20). All the clips (26) are mounted at the same height on the longitudinal tubular members (21). Accordingly, a shelf (40) can be mounted in the stand by clipping flanges extending downward from edges of the shelf (40), such that objects like cooking utensils or food can be put on the shelf (40). The use of the stand becomes more versatile. In another embodiment, with reference to FIG. 6, a bar (42) is mounted between two clips (26) respectively mounted on the two side frames (20) so as to support the stand in an expanded position.

When the barbecue grill (30) or the water basin (50) is not in use, with reference to FIGS. 2, 3, 4, 7 to 9, the barbecue grill (30), the shelf (40), the bar (42) or the water basin (50), as applicable, are first removed from the stand. The clasps

(24) are then released from the L-shaped lock plate (122) on the stop (12), such that the side frames (20) can pivot relative to the bottom frame (10), and the stand is folded. Because the side frames (20) are respectively pivotally attached to the bottom frame (10) by pairs of pivot pins (16) at different heights, one of the side frames (20) can overlap the other side frame (20), and both side frames (20) are parallel to the bottom frame (10). The size of the stand is reduced. The transportation and storage of the stand become more convenient.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A stand comprising:
   a bottom frame;
   a first side frame pivotally attached to one end of the bottom frame with a first pair of pivot pins;
   a first clasp mounted on the first side frame, the first side frame detachably engages with the bottom frame so as to position the first side frame perpendicular to the bottom frame;
   a second side frame pivotally attached to the other end of the bottom frame with a second pair of pivot pins to be adapted to support an object with the first side frame;
   a second clasp mounted on the second side frame detachably engages with the bottom frame so as to position the second side frame perpendicular to the bottom frame; and
   a stop is mounted on each side of the bottom frame and has two ends respectively abutting the first and second side frames, wherein opposite ends of the stop respectively face the first clasp and the second clasp; and
   the first clasp has a structure the same as the second clasp and has a hook formed on the free end of the first clasp to engage the facing stop.

2. The stand as claimed in claim 1, wherein the bottom frame comprises four tubular members as a rectangle.

3. The stand as claimed in claim 2, wherein a first pivotal plate extends upward from each side of one end of the bottom frame to pivotally connect with each side of the first side frame with the first pair of pivot pins; and
   a second pivotal plate extends upward from each side of the other end of the bottom frame to pivotally connect with each side of the second side frame with the second pair of pivot pins.

4. The stand as claimed in claim 3, wherein each second pivotal plate is longer than each first pivotal plate; and
   each of the second pair of pivot pins is higher than each of the first pair of pivot pins.

5. The stand as claimed in claim 4, wherein the difference in the height of the first pair of pivot pins and the second pair of pivot pins is substantially equal to a thickness of the first side frame.

6. The stand as claimed in claim 1, wherein the first side frame has a structure the same as the second side frame; and
   the first side frame is composed of two longitudinal tubular members with a top and bottom end and a lateral tubular member secured to the top of the longitudinal tubular members as an inverse U-shaped frame.

7. A stand comprising:
   a bottom frame;
   a first side frame pivotally attached to one end of the bottom frame with a first pair of pivot pins;
   a first clasp mounted on the first side frame, the first side frame detachably engages with the bottom frame so as to position the first side frame perpendicular to the bottom frame;
   a second side frame pivotally attached to the other end of the bottom frame with a second pair of pivot pins to be adapted to support an object with the first side frame, wherein the first side frame has a structure the same as the second side frame;
   a second clasp mounted on the second side frame the second side frame, detachably engages with the bottom frame so as to position the second side frame, wherein the first side frame is composed of two longitudinal members with a top and bottom end and a lateral member secured to the top of the longitudinal members as an inverse U-shaped frame; and
   an opening is defined in each longitudinal member of each side frame to be adapted to receive a stub attached to a bottom of the object.

8. A stand comprising:
   a bottom frame;
   a first side frame pivotally attached to one end of the bottom frame with a first pair of pivot pins;
   a first clasp mounted on the first side frame, the first side frame detachably engages with the bottom frame so as to position the first side frame perpendicular to the bottom frame;
   a second side frme pivotally attached to the other end of the bottom frame with a second pair of pivot pins to be adapted to support an object with the first side frame, wherein the first side frame has a structure the same as the second side frame;
   a second clasp mounted on the second side frame, the second side frame detachably engages with the bottom frame so as to position the second side frame, wherein the first side frame is composed of two longitudinal members with a top and bottom end and a lateral member secured to the top of the longitudinal members as an inverse U-shaped frame; and
   an elastic clip attached to each longitudinal member of each side frame;
   all the elastic clips are mounted at the same height on the longitudinal members to support an object.

9. The stand as claimed in claim 1, wherein the stop facing the clasps has an inverse U-shaped section; and
   an L-shaped lock plate is attached to each end of the stop to engage the hook of one of the clasps.

10. The stand as claimed in claim 8, wherein the first pivotal pins and the second pivotal pins are located at different heights relative to the bottom frame.

11. The stand as claimed in claim 10, wherein the longitudinal and lateral members of the first side frame are tubular.

12. The stand as claimed in claim 10, wherein the difference in the height of the first pair of pivot pins and the second pair of pivot pins is substantially equal to a thickness of the first side frame.

13. The stand as claimed in claim 8, wherein a first pivotal plate extends upward from each side of one end of the bottom frame to pivotally connect with each side of the first side frame with the first pair of pivot pins; and a second pivotal plate extends upward from each side of the other end of the bottom frame to pivotally connect with each side of the second side frame with the second pair of pivot pins.

14. The stand as claimed in claim 13, wherein each second pivotal plate is longer than each first pivotal plate; and each of the second pair of pivot pins is higher than each of the first pair of pivot pins.

15. The stand as claimed in claim 14, wherein the first pivotal pins and the second pivotal pins are located at different heights relative to the bottom frame.

16. The stand as claimed in claim 1, wherein the first pivotal pins and the second pivotal pins are located at different heights relative to the bottom frame.

17. The stand as claimed in claim 7, wherein the first pivotal pins and the second pivotal pins are located at different heights relative to the bottom frame.

18. The stand as claimed in claim 17, wherein the longitudinal and lateral members of the first side frame are tubular.

19. The stand as claimed in claim 18, wherein the difference in the height of the first pair of pivot pins and the second pair of pivot pins is substantially equal to a thickness of the first side frame.

20. The stand as claimed in claim 19, wherein a first pivotal plate extends upward from each side of one end of the bottom frame to pivotally connect with each side of the first side frame with the first pair of pivot pins; and a second pivotal plate extends upward from each side of the other end of the bottom frame to pivotally connect with each side of the second side frame with the second pair of pivot pins.

* * * * *